No. 652,364. Patented June 26, 1900.
C. HETZEL.
PROPELLING DEVICE FOR VELOCIPEDES.
(Application filed Aug. 24, 1897.)
(No Model.)
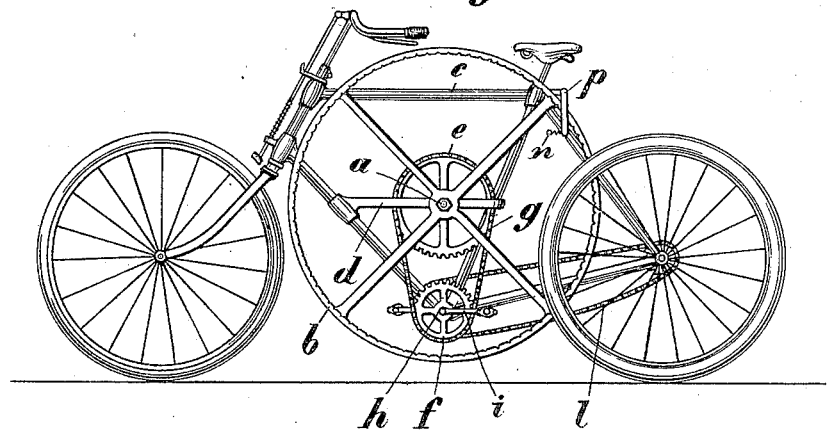
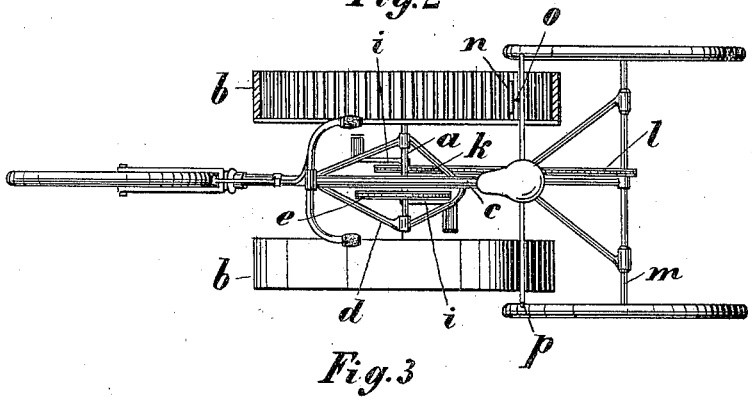
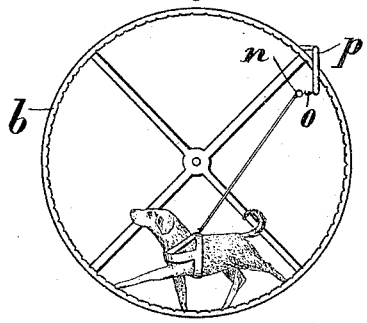
Witnesses
Inventor

UNITED STATES PATENT OFFICE.

CARL HETZEL, OF WASSELNHEIM, GERMANY.

PROPELLING DEVICE FOR VELOCIPEDES.

SPECIFICATION forming part of Letters Patent No. 652,364, dated June 26, 1900.

Application filed August 24, 1897. Serial No. 649,372. (No model.)

*To all whom it may concern:*

Be it known that I, CARL HETZEL, manufacturer, of Wasselnheim, Alsatia, German Empire, have invented new and useful Improvements in Propelling Devices for Velocipedes and other Vehicles, of which the following is a specification.

This invention relates to a new or improved propelling device for velocipedes and other vehicles, consisting of box or similar wheels which are rotated by dogs or other animals.

The propelling device in question is illustrated in the annexed drawings as adapted to a tricycle.

Figure 1 shows a side view, Fig. 2 a plan, and Fig. 3 a detail, of the propelling device.

The new or improved device consists of two box or similar wheels $b$, mounted on shaft $a$, which has its bearings in stays $d$, connected with the cycle-frame $c$. A chain-wheel $e$ is mounted on shaft $a$ and is connected with another chain-wheel $f$, mounted on crank-axle $h$ by means of chain $g$. The crank-axle $h$ is further provided with chain-wheel $k$, connected, through chain $l$, with a chain-wheel mounted on the hind-wheel axle $m$. The animals employed for rotating the box-wheels $b$ are harnessed to a cross-piece $n$, connected by spring $o$ to a rod $p$, the latter being secured to the frame of the cycle in any suitable manner. The weight of the animals combined with their strength causes the box-wheels $b$ to rotate, together with shaft $a$ and chain-wheel $e$, this motion being transmitted by chain $g$ to chain-wheels $f$ and $k$ and the hind wheels of the vehicle, whereby the latter is propelled.

If the pedal-crank $i$ is worked by the rider simultaneously with the box-wheels being rotated by the animals, more extensive transmissions may be employed in order to increase the speed of the vehicle without exercising a tiring effect on the rider.

Having now described my invention, what I claim, and desire to secure by Letters Patent, is—

In combination with a cycle, an axle journaled above the ordinary crank-shaft and between the seat-post and front fork, a cage on each end of said axle and beyond the line of movement of the pedals and the connection between the said axle and the crank-shaft, substantially as described.

In testimony that I claim the foregoing as my invention I have signed my name in presence of two subscribing witnesses.

CARL HETZEL.

Witnesses:
ALFRED SCHMITT,
ERNEST THERION.